(12) United States Patent
Greenwood (10) Patent No.: US 10,965,749 B2
(45) Date of Patent: Mar. 30, 2021

(54) DYNAMIC DATA BATCHING

(71) Applicant: 1E Limited, London (GB)

(72) Inventor: Adrian Greenwood, Maineville, OH (US)

(73) Assignee: IE Limited, London (GB)

(*) Notice: Subject to any disclaimer, the term of this patent is extended or adjusted under 35 U.S.C. 154(b) by 213 days.

(21) Appl. No.: 15/949,838

(22) Filed: Apr. 10, 2018

(65) Prior Publication Data

US 2019/0312931 A1  Oct. 10, 2019

(51) Int. Cl.
| | |
|---|---|
| *G06F 15/16* | (2006.01) |
| *H04L 29/08* | (2006.01) |
| *G06F 16/22* | (2019.01) |
| *G06F 16/27* | (2019.01) |
| *G06F 16/951* | (2019.01) |

(52) U.S. Cl.
CPC .......... *H04L 67/1097* (2013.01); *G06F 16/22* (2019.01); *G06F 16/27* (2019.01); *G06F 16/951* (2019.01)

(58) Field of Classification Search
CPC ..... H04L 47/263; H04L 47/30; H04L 47/365; H04L 67/1097; G06F 16/21; G06F 16/2386; G06F 16/22; G06F 16/27; G06F 16/951
See application file for complete search history.

(56) References Cited

U.S. PATENT DOCUMENTS

| | | | |
|---|---|---|---|
| 6,807,572 B1* | 10/2004 | Yu | G06F 16/972 709/219 |
| 7,543,273 B2 | 6/2009 | Chow et al. | |
| 7,657,508 B2 | 2/2010 | Morris et al. | |
| 7,984,112 B2 | 7/2011 | Huang | |
| 8,804,515 B2 | 8/2014 | Kampmann et al. | |
| 10,261,862 B2* | 4/2019 | Hrle | G06F 16/21 |
| 2010/0332531 A1* | 12/2010 | Galande | G06F 16/27 707/770 |
| 2014/0101102 A1* | 4/2014 | Baumgarten | G06F 16/273 707/634 |
| 2017/0322993 A1* | 11/2017 | Brodt | G06F 16/2358 |
| 2018/0336261 A1* | 11/2018 | Reese | G06F 16/282 |
| 2019/0007349 A1* | 1/2019 | Wang | H04L 47/365 |

FOREIGN PATENT DOCUMENTS

JP    2014220621 A    11/2014

OTHER PUBLICATIONS

Alkis Simitsis, et al. "Logical Otimization of ETL Workflows" HDMS'05—Aug. 25, 2005.
Tathagata Das, et al. "Adaptive Stream Processing using Dynamic Batch Sizing"; Electrical Engineering and Computer Sciences, University of California at Berkeley. Technical Report No. UCB/EECS-2014-133 Jun. 3, 2014 http://www.eecs.berkeley.edu/Pubs/TechRpts/2014/EECS-2014-133.html.

* cited by examiner

*Primary Examiner* — Oleg Survillo
(74) *Attorney, Agent, or Firm* — EIP US LLP (57) ABSTRACT

The present disclosure relates to a network, comprising a switch, a server and a database, and specifically the dynamic batching of data from the switch to the server for uploading to the database according to dynamic feedback received from a monitoring device arranged to obtain operation metrics from at least one of the server device and the database.

20 Claims, 3 Drawing Sheets

DYNAMIC DATA BATCHING

BACKGROUND OF THE INVENTION

Field of the Invention

Embodiments disclosed herein relate to a method of uploading data to a database, and specifically the dynamic batching of data in response to feedback received from a monitoring device.

Description of the Related Technology

Computer networks allow networked devices to exchange data with each other along communication channels (data connections) established using either physical cable media, or wireless media. A network switch connects networked devices together, electrically and logically, by using data packet switching to receive, process and forward data (sent in packets) over a computer network to the intended network device, or devices. Each network device connected to a switch can be identified using a Media Access Control (MAC) address, a unique identifier allowing the switch to regulate and direct the flow of network traffic, improving the security and efficiency of the network.

Different computer systems, networks and connection types employ different communication protocols to send and receive data. The most common network for data transmission is the Internet, which uses the Transmission Control Protocol (TCP) as the core protocol of the Internet protocol suite (IP). TCP is a "reliable" protocol which notifies the sender of data if individual data packets fail to be delivered.

If multiple data packets are addressed to same network device(s), a network switch may batch/cluster the data packets together in order to better utilise the network capacity and speed up network throughput, whilst simultaneously reducing latency. When network operations are batched, there are fewer data packets sent over the network (since there are fewer individual TCP segments).

Embodiments disclosed herein allow data to be transmitted over a network and uploaded to a database more quickly.

SUMMARY

According to a first aspect of the present disclosure, there is provided a system comprising: a network switch to arranged to transmit queries to, and receive response data from, multiple devices on a network; a server device arranged to receive batched response data from the network switch and insert it into a database; the database arranged to store the batched response data from the server device; and a monitoring device arranged to obtain operation metrics from at least one of the server device and the database, and forward the obtained operation metrics to the server device, wherein the server device processes the operation metrics obtained by the monitoring device and transmits dynamic feedback comprising batch size information to the network switch, and the network switch batches the response data according to the dynamic feedback to reduce the time taken to insert data into the database.

According to a second aspect of the present disclosure, there is provided a method of transmitting and storing data over a network, the method comprising: receiving, at a network switch, response data from at least one network connected device; batching, at the network switch, the response data for transmission to a server device; and inserting, by the server device, the batched response data into a database, whereby the method further comprises: obtaining, at a monitoring device, at least one operation metric from at least one of the server device and the database; transmitting the at least one operation metric to the server device for processing; calculating optimal batch size information at the server device to reduce the time taken to insert data into the database; transmitting dynamic feedback comprising batch size information from the server device to the network switch; and batching, at the network switch, the response data according to the dynamic feedback received from the server device.

Further features and advantages will become apparent from the following description of preferred embodiments, given by way of example only, which is made with reference to the accompanying drawings.

DETAILED DESCRIPTION OF CERTAIN INVENTIVE EMBODIMENTS

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
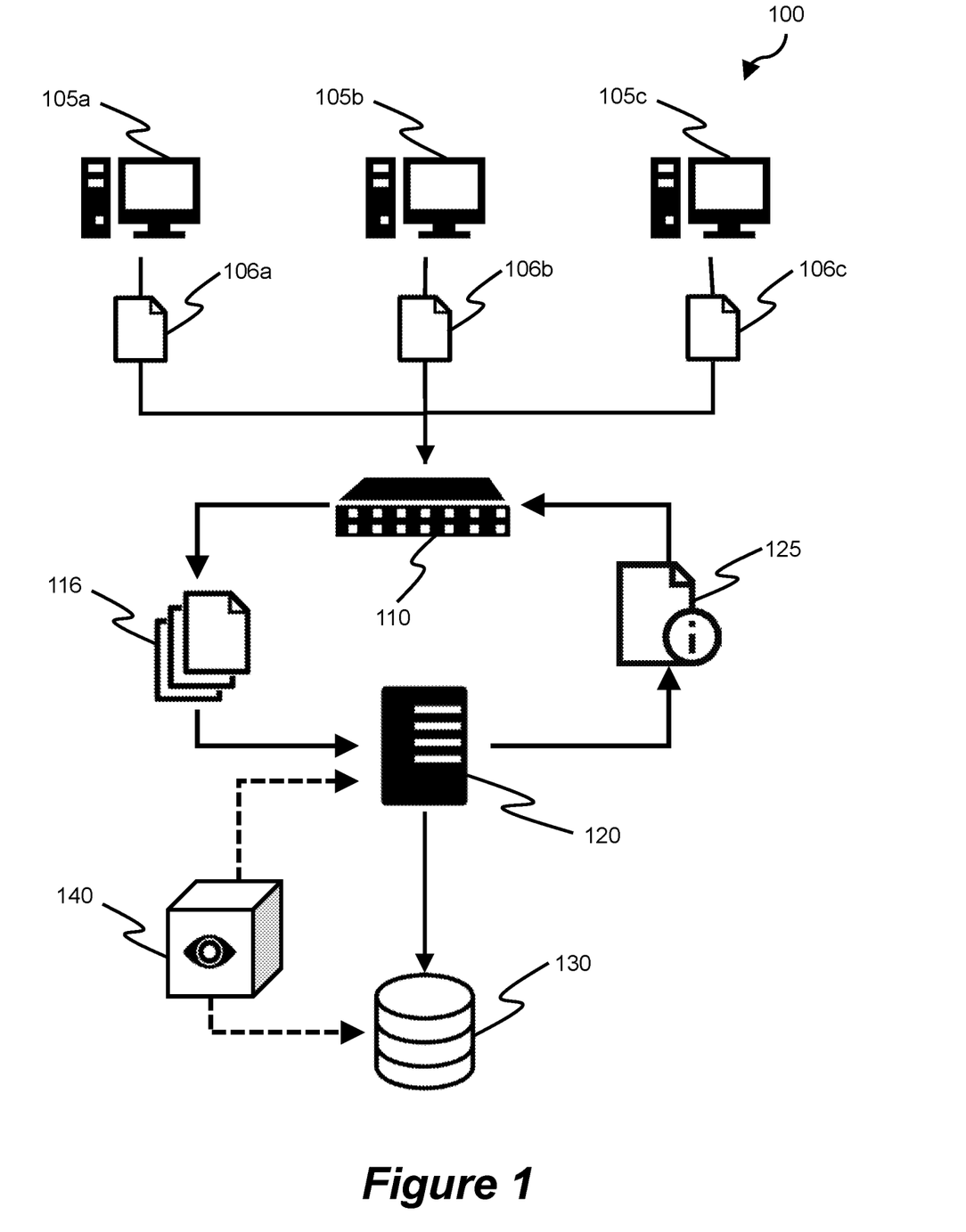
FIG. 1 shows a schematic view of an example network setup.

FIG. 1 shows an example network system 100, e.g. a "networking environment", comprising various network infrastructure components according to an example. In FIG. 1, multiple network devices 105a; 105b; 105c are communicatively coupled to a network switch 110. Devices of the network system 100 which are "communicatively coupled" are connected to one another over a communication channel. The communication channel can be a wired or wireless connection between the devices of the network system 100. The network system 100 may comprise a Wi-Fi network, a local area network (LAN), a wide area network (WAN), etc. In the example shown in FIG. 1, the network system 100 may comprise a private or public network. For example, the network system 100 may comprise a private enterprise network accessible to only those network devices 105a; 105b; 105c which are authorized to access it. Alternatively, the network system 100 may comprise a public network such as the Internet and/or a cellular network (e.g. a mobile phone network).

The network devices 105a; 105b; 105c, may include, but are not limited to, computer devices, smartphones, tablets, network-coupled sensors, gateways, routers, switches, bridges, hubs, repeaters, proxy servers, border controllers, file servers, network-coupled storage devices, firewall devices etc.

The network system 100 of FIG. 1 also comprises a server device 120 connected to the network switch 110, and a database 130 connected to the server device 120. In certain cases, the server device 120 and the network switch 110 may be implemented in the same device, e.g. a database server, on the network system 100.

The switch 110 (also called a "switching hub", a "bridging hub", or a "MAC bridge") may comprise a processor and memory to function in its receiving, processing and forwarding of packet data over the network system 100 to the intended network device(s). Instructions may be sent to, and response data received from, each of the network via the server 120 and the switch 110. For example, an end user may command the server 120 to provide instructions to one or more of the network devices 105a; 105b; 105c via the switch 110. In examples, the end user may command the server 120 using a user terminal connected to the server 120. Furthermore, response data from the one or more network devices 105a; 105b; 105c may be received at the terminal, via the server 120 and the switch 110. In other examples, the server 120 may be accessed and operated by means other than a user terminal, such as by another, remote, server over a network connection. The communication of instruction data and response data between the network devices 105a; 105b; 105c and the switch 110 may be independent of any information transfer between the switch 110 and the server 120.

In examples, the communication channel(s) between the switch 110 and a network device 105a; 105b; 105c is maintained as a "persistent connection". A persistent connection is a single connection, e.g. a single TCP connection, which may be used to send and receive multiple instructions and responses, e.g. multiple HTTP requests and responses. A persistent connection (also called an "HTTP persistent connection", "HTTP keep-alive", or "HTTP connection reuse") may be used instead of opening a new connection for each instruction and corresponding response.

After the successful completion of a round of instruction-and response data, the respective communication channel(s) is/are not dropped, but instead kept open. When the switch 110 sends further set of instructions, and a network device 105a; 105b; 105c responds, the same communication channel(s) is/are used as before. The communication channel(s) will remain open until either the switch 110 or the network device 105a; 105b; 105c drops the communication channel(s). This helps reduce network overheads accrued from dropping and opening communication channels for each instance of data transfer.

In certain cases, the multiple instructions and responses sent between the switch 110 and a network device 105a; 105b; 105c, via the persistent connection, may be multiplexed in accordance with the HTTP/2 protocol.

Each network device 105a; 105b; 105c may incorporate a software agent (not shown). The software agent may carry out queries or execute requests at each respective network device 105a; 105b; 105c in response to instructions received via the server 120 and the switch 110, e.g. originating at the user terminal. In an example, each network device 105a; 105b; 105c incorporates only a single software agent. The software agents may also send response data back, on their respective communication channels, via the switch 110 and the server 120, e.g. to the user terminal.

When the switch 110 is initiated, it may create a number of worker processes, e.g. by utilizing its processor. The worker processes may pre-allocate a communication channel endpoint (also called a "socket") in the switch 110 to each of at least one network device 105a; 105b; 105c as the network device(s) connect to the network system 100. The worker processes may proceed to establish a communication channel between each network device 105a; 105b; 105c and the switch 110. In an example, the worker processes establish only a single connection channel for each network device 105a; 105b; 105c, and therefore only a single socket in the switch 110 is allocated to each network device 105a; 105b; 105c. In a further example, the switch 110 creates a given number of worker processes, the given number depending on a number of network devices 105a; 105b; 105c, software agents, and/or communication channels requested by a given software agent. The number of worker processes may be limited, for example to sixty-four, so as to avoid the switch 110 overwhelming the server 120 with data in response to instructions received, e.g. from the user terminal.

When data is to be transferred between the switch 110 and one of the multiple network devices 105a; 105b; 105c, a communication channel may initially be established between the switch 110 and the respective network device 105a; 105b; 105c, e.g. when the network device 105a; 105b; 105c connects to the network system 100. In one example, upon connection to the network, the software agent on the network device 105a; 105b; 105c may forward "static data" concerning the network device 105a; 105b; 105c to the switch 110, to be stored in a corresponding receive socket buffer in the switch 110.

After the initial network set up is complete, queries or execution requests may be sent from the server 120 (e.g. as directed by a user terminal) over the network, via the switch 110, for the software agent on the network device 105a; 105b; 105c to carry out. The software agent carries out the instructions on the network device 105a; 105b; 105c and sends the response data back to the server 120 (e.g. and onto the terminal) via the switch 110.

Figure 2:
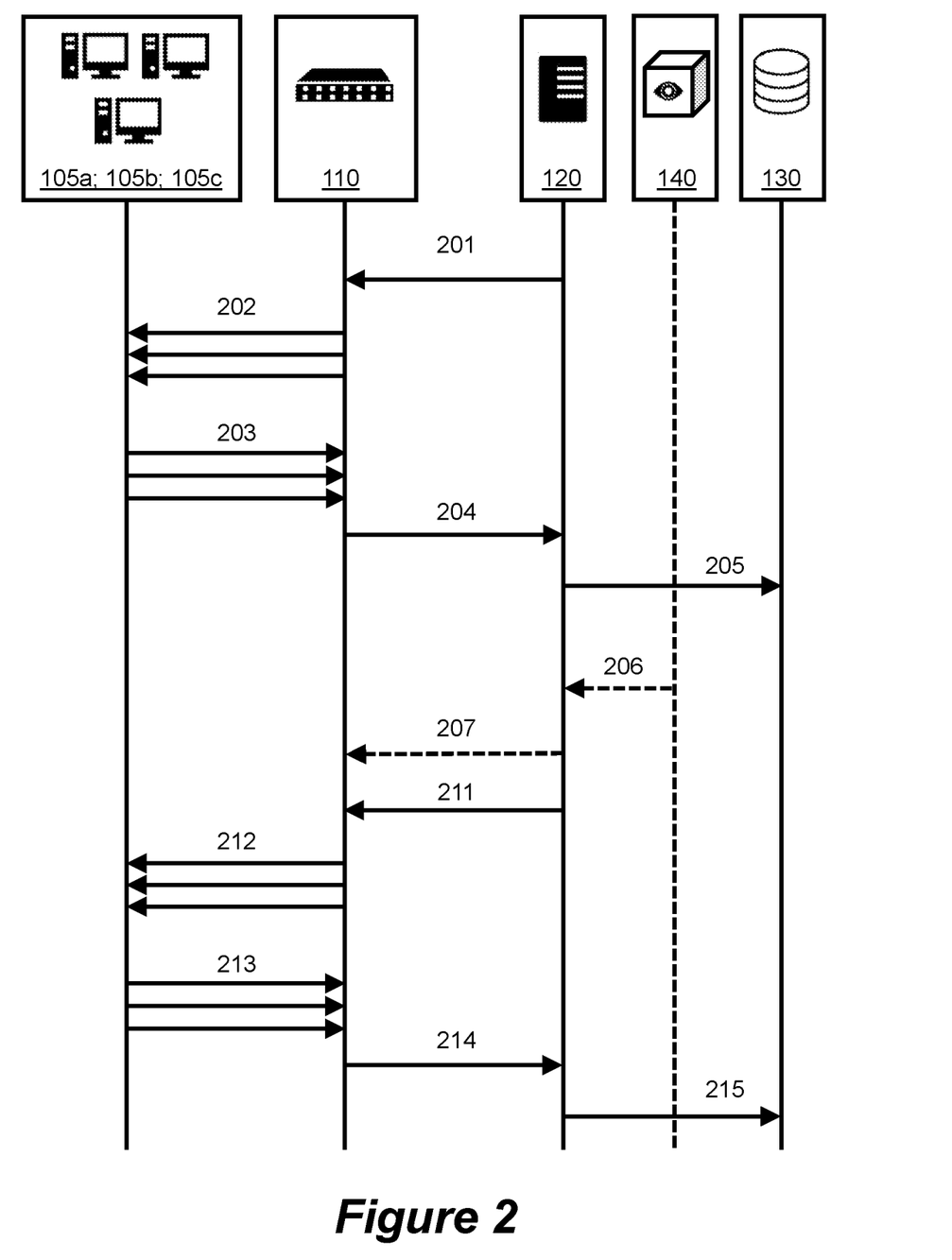
FIG. 2 shows an example data transmission diagram between the components shown in FIG. 1.

FIG. 2 shows an example of network traffic travelling between the components of the network system 100 shown in FIG. 1. In one example, the server device 120 transmits (step 201) a query to the network switch 110. Different queries may be addressed to different network devices 105a; 105b; 105c on the network 100. The network switch 110 then transmits (step 202) the query across the network to the appropriate recipients 105a; 105b; 105c. In one example, the network devices 105a; 105b; 105c on the network each comprise a client device. The network devices 105a; 105b; 105c are arranged to receive queries transmitted over the network, process the queries, and transmit (step 203) a respective response 106a; 106b; 106c back to the server device 120, via the network switch 110, as described above. For example, each network device 105a; 105b; 105c may incorporate a software agent, as described.

Instead of transmitting each response 106a; 106b; 106c individually to the server device 120, e.g. as and when the network switch 110 receives them, the individual responses 106a; 106b; 106c are collated or "batched" before transmission (step 204) to the server device 120. Since multiple data packets are addressed to the same network device (in this case the server device 120), the batched packets 116 make better use of the network capacity and speed up the network throughput, whilst simultaneously reducing latency, compared to sending the individual responses 106a; 106b; 106c as and when the network switch 110 receives them. When network operations are batched, fewer data packets are sent over the network (since there are fewer individual TCP segments), and data is transmitted faster across the network. Finally, the server device 120 uploads (step 205) the batched data 116 to the database 130.

Response data 106a; 106b; 106c received at the switch 110 from a given network device 105a; 105b; 105c may comprise data indicative of a response of the given network device 105a; 105b; 105c to a query or request submitted thereto. For example, the software agent implemented on the given network device 105a; 105b; 105c may carry out the queries or execute the requests in response to instructions received thereat. The software agent may generate the data indicative of the response of the given network device 105a; 105b; 105c. In examples the software agent generates the response data 106a; 106b; 106c for the given network device 105a; 105b; 105c and includes the data indicative of the response.

For example, a user may submit a request to the network devices 105a; 105b; 105c, via the server 120 and the switch 110, for each network device 105a; 105b; 105c to provide which version of an application the respective network device 105a; 105b; 105c has installed thereon. The response data 106a; 106b; 106c from each network device 105a; 105b; 105c may therefore include the respective application versions corresponding to each network device 105a; 105b; 105c. The software agents may receive and execute the request on their corresponding network devices 105a; 105b; 105c and generate the data indicative of the responses thereof, e.g. the version numbers. The version numbers may then be included in the response data 106a; 106b; 106c of the network devices 105a; 105b; 105c, e.g. as part of a data structure such as a record in Structured Query Language (SQL).

The response data 106a; 106b; 106c of the network devices 105a; 105b; 105c, e.g. comprising records, may correspond with a database object stored in the database 130, e.g. a table.

For example, the database object, e.g. table, stored in the database 130 may comprise multiple entities or "fields". A field is a column in the table which may correspond to a type of information to be stored about the records in the table. The fields may be stored as metadata, e.g. as headers of the table. The records, also called "rows" are individual entries in the table. A record is a composite datatype able to hold more than one piece of information.

Thus, each column is a vertical entity in the table that contains all information associated with a specific field in the table. Each record, or row, is a horizontal entity in the table which may contain multiple data values, each data value corresponding to a column. The different data values may have different datatypes, for example character, floating-point number, or alphanumeric string.

Data values of a record may be assigned directly to individual fields or to the whole record, e.g. by utilizing an assignment operator of a procedural programming language.

Thus, returning to the example above; wherein a request is submitted, via the server 120 and the switch 110, to the network devices 105a; 105b; 105c for each of them to provide a version number of an application that is installed; the software agent on each network device 105a; 105b; 105c may create a record to store the version number as a data value in the record. The 'version number' may thus be a field in the record. The created record may also comprise other fields, e.g. corresponding to different attributes of the network device 105a; 105b; 105c, to store associated data values therein. The records created by the software agents of the network devices 105a; 105b; 105c, including the query responses stored as data values in the records, may be sent to the network switch as response data 106a; 106b; 106c (FIG. 2; 203).

The network switch 110 may initially batch the response data 106a; 106b; 106c according to a default batch size configuration. The default batch size configuration may set a maximum number of records to be collated in a batch. For example, the records received from the network devices 105a; 105b; 105c may be batched together, e.g. with a batch size of up to 1000 records. In some examples, the default batch size configuration is computed as 1,000 divided by the number of columns in the records. In examples where the batched response data 106a; 106b; 106c includes a greater number of records, i.e. a larger batch size, than the default batch size, the server device 120 may split the batched data internally after receiving it from the switch 110 (step 105). The batched data may be split up by the server device 120 to match an optimum batch size for multi-row insertion when inserting the records into the database 130, which is discussed further below.

The network system 100 also comprises a monitoring device 140 in communication with both the server device 120 and the database 130. In some examples, the monitoring device 140 is only in communication with one of the server device 120 and the database 130.

The monitoring device 140 may be implemented by instrumentation tools provided by one or more computer programming languages. For example, use may be made of an "SQL trace" or database management system monitoring functionality. These may provide performance data relating to executed commands Additionally, or alternatively, tracing, profiling, logging and/or debugging commands available within a computer programming language may be used to monitor a performance of executed commands and provide associated operational metrics. A database management system may also provide access to operational metrics that are measured as it executes query statements. This functionality may need to be activated in certain database management systems.

The monitoring device 140 may monitor communications of the server device 120 and/or the database 130 to obtain associated operational metrics as the batched response data 116 is uploaded (step 205) from the server device 120 to the database 130. The operational metrics may comprise one or more of: a measurement of response times for the batched data 116 to be inserted into the database 130; a shape (i.e. the number of columns represented in the records, and the data type for each column) and/or size of the batched data 116 being uploaded; and any batching scheme used at any previous time during a batched data upload process. In one example, further operational metrics associated with communications of the server device 120 and/or the database 130, which are not listed above, are also be monitored.

The monitoring device 140 may transmit, e.g. forward, (step 206) at least one monitored operation metric from the server device 120 and/or the database 130 back to the server device 120. The server device 120 receives the at least one operation metric and calculates an optimal batch size and/or shape to implement to reduce the time taken to insert response data into the database 130. Based on the shape and size of the incoming response data 106a; 106b; 106c, and on a "per call" basis, the server device 120 may calculate the best method of inserting said responses into the database 130. For example, the server device 120 may indicate whether multi-row or bulk inserts, or single-call or multiple-calls, will be the most efficient.

Data stored in a record may be inserted into the database 130, e.g. as part of a relational database management system (RDBMS), using a command. The command may be an SQL statement, for example. Multiple records may be inserted into the database 130, as corresponding multiple rows to be stored therein, using a multi-row command, e.g. an SQL 'INSERT' statement. The multi-row command may include an argument which references a table stored in the target database 130, and one or more arguments which point(s) to the multiple records to be inserted into the table. The multiple records may be stored in one or more data files as part of the batched response data 116.

Multiple records may alternatively be inserted into the database 130, as corresponding multiple rows to be stored therein, using a bulk command, e.g. an SQL 'BULK INSERT' statement. By using the bulk command, the batched response data 116 may be sent to the database 130, and inserted into the table stored therein, in batches rather than record by record when using the multi-row command. The bulk command may include an argument which specifies a batch size, e.g. as a number of rows or as a data capacity, for sending the response data 116 to the database 130 for inserting into the table. Bulk commands may be used for inserting many thousands of rows into a database during an insertion operation. For example, bulk commands may be used when a given instruction sent to network devices 105a; 105b; 105c results in the response data 106a; 106b; 106c per machine containing a large number of records or rows.

In an example, the switch 110 may receive a Batch Size Hint (BSH) data value from the server device 120, e.g. in response to reading an instruction being sent to the network devices 105a; 105b; 105c via the server device 120. The BSH value may be based on a number of fields in the records that are to be filled with responses from the network devices 105a; 105b; 105c. In a certain case, the BSH value may be computed as:

$$BSH = 3 \times \left( \frac{1000}{N_{fields} + 4} \right),$$

where Nfields is the number of fields per record as described above.

The switch 110 may determine a number of records in the batched response data 116 and compare the number of records to a predetermined threshold value. The predetermined threshold value may have a default value, e.g. one thousand, but be adjustable by a user.

In response to determining that the number of records in the batched response data 116 is below the predetermined threshold, the switch 110 may indicate to the server device 120, e.g. by sending indication data, that the multi-row command, e.g. the SQL 'INSERT' statement, should be used to insert the multiple records of the batched response data 116 into the database 130. The server device 120 may re-batch the collated response data 116 based on the BSH value. In certain cases, the server device 120 may re-batch the collated response data 116 by a factor of one third of the BSH value computed according to the above equation.

In response to determining that the number of records in the batched response data 116 is above the predetermined threshold, the switch 110 may indicate to the server device 120, e.g. by sending indication data, that the bulk command, e.g. the SQL 'BULK INSERT' statement, should be used to insert the multiple records of the batched response data 116 into the database 130.

In examples, the server device 120 receives the at least one operation metric from the monitoring device 140. The at least one operation metric may be a function of an upper, e.g. total, processing time value of a previous transmission of batched response data 116 from the server device 120 to the database 130. For example, an Inserted Rows per second operation metric measured by the monitoring device 140 may be indicative of a number of records that were inserted into the table stored in the database 130, during the previous transmission of batched response data 116 from the server 120, divided by the total processing time (in seconds) for the operation. Similarly, an Average Batch Size per second operation metric measured by the monitoring device 140 may be indicative of a sum of all batch sizes (e.g. corresponding to a total number of rows) that were inserted into the table stored in the database 130, during the previous transmission of batched response data 116 from the server 120, divided by the total number of batches that were inserted into the table during the operation.

The server device 120 may generate a relation between the operation metrics received from the monitoring device 140. For example, the server device 120 may generate a parametric model involving the operation metrics, e.g. the Inserted Rows per second and Average Batch Size per second operation metrics described above. In a certain example, the server device 120 may generate a quadratic model, e.g.

$$y = ax^2 + bx + c,$$

where y is a variable which represents the Inserted Rows per second operation metric, and x is a variable which represents the Average Batch Size per second operation metric. The parameters a, b and c may be calculated using a number of samples of x and y values from a corresponding number of previous insertions of batched response data 116 into the table stored in the database 130. The quadratic model is a second order polynomial model of the operation metrics. In other examples, a polynomial model of a different order may be used, and there may be a different number of parameters a, b, c . . . of the model that are calculated by the server device 120.

In examples, the server device 120 may adjust the relation by changing the respective values of the variables corresponding to the operation metrics x and y. The server device 120 may adjust the relation to increase at least one operation metric, e.g. the Inserted Rows per second metric. For example, the server device 120 may adjust the relation to increase y with respect to x. In examples, the server device 120 may adjust the relation to optimize at least one operation metric, e.g. optimize y with respect to x. For the quadratic model example above, the server device 120 may compute the expression $OBS = -b/2a$ to give a value of x (the Average Batch Size per second operation metric) which maximizes y (the Inserted Rows per second operation metric) in the model. The computed OBS value may therefore correspond to optimal batch size information 125. For a different model of the operation metrics, the OBS value (i.e. optimal batch size information 125) may be computed by the server device 120 using a corresponding expression for the parameters a, b, c . . . of the model.

In certain cases, the server device 120 may attempt to generate a batch of data based on the BSH value but may be limited by one or more of buffer and time limits. For example, it may not be possible to batch data based on the BSH value, if a buffer limit is met (e.g. due to received data) and/or if a predefined time limit expires. In these cases, the server device 120 may be adapted to use the parametric model involving the operation metrics as described above.

In certain cases, the server device 120 may reset in-memory samples when a new request is submitted by the switch 110 or a new instruction is requested. In this case, the parametric model may also be reset, and the dynamic batch feedback procedure restarted.

Once the server device 120 has completed the calculations, dynamic feedback comprising the optimal batch size information 125 is transmitted (step 207) back to the network switch 110. The next data batching operation will be implemented according to the dynamic feedback comprising batch size information 125 received from the server device 120.

As shown in the example of FIG. 2, after transmitting (step 207) the dynamic feedback comprising optimal batch size information 125 from the server device 120 to the network switch 110, the process may begin again. The server device 120 transmits (step 211) a query to the network switch 110. The network switch 110 then transmits (step 212) the query across the network to the appropriate recipients 105a; 105b; 105c. The network devices 105a; 105b; 105c transmit (step 213) a response 106a; 106b; 106c over the network back to the server device 120, via the network switch 110. The network switch 120 implements the new optimal batch size when batching the received response data 106a; 106b; 106c before transmitting (step 214) the batched data 116 to the server device 120. As the server device 120 uploads (step 215) the batched data to the database 130, the monitoring device 140 again monitors the operational metrics of the server device 120 and/or the database 130 and transmits at least one monitored operation metric from the server device 120 and/or the database 130 back to the server device 120 for calculation of an updated optimal batch size for transmission to the network switch 110.

The process of the monitoring device 140 monitoring the operational metrics, reporting back to the server device 120, calculating the optimal batch size information and instructing the network switch 110 may be repeated, iteratively, so that the network switch 110 dynamically/heuristically batches the incoming response data 106a; 106b; 106c to achieve the best upload rate from the server device 120 to the database 130. The optimal batch size varies depending on the size and shape of the response data received by the network switch 110. The size and shape of the response data is effected by the schema of the corresponding query sent from the server device 120, as well as hard limits within the network switch 110 related to the maximum buffer size and maximum transmission time length.

This results in the server device 120 becoming dynamically/heuristically more efficient at inserting response data 106a; 106b; 106c into the database 130, and ultimately able to obtain the aggregate data faster.

Figure 3:
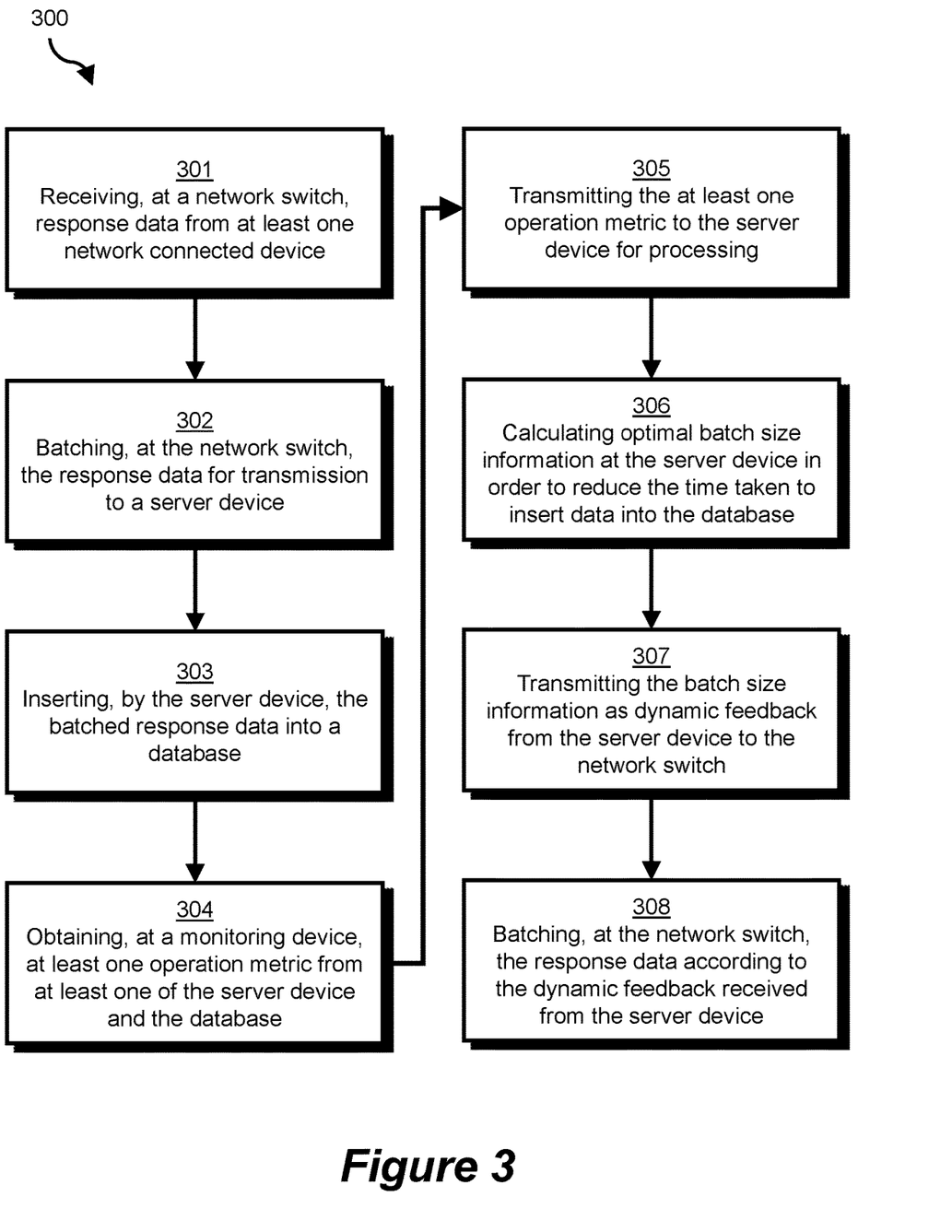
FIG. 3 shows a flowchart of an example method of dynamic data batching.

FIG. 3 shows a flowchart of a method 300 of dynamic data batching according to the example described above. At block 301, a network switch receives response data from at least one network connected device. At block 302, the network switch batches the response data for transmission to a server device. At block 303 the server device inserts the batched response data into a database. At block 304, a monitoring device obtains at least one operation metric from at least one of the server device and the database. At block 305 the at least one operation metric is transmitted to the server device for processing. At block 306 the server device calculates optimal batch size in order to reduce the time taken to insert data into the database. At block 307 the dynamic feedback comprising batch size information is transmitted as dynamic feedback from the server device to the network switch. At block 308, the network switch batches subsequent response data according to the dynamic feedback received from the server device.

Various measures (for example systems and methods) are provided in which a network includes a network switch to receive response data from at least one network connected device. The network switch also batches the response data for transmission to a server device on the network. The server device is to insert the batched response data into a database connected to the network. The network also includes a monitoring device to obtain at least one operation metric from at least one of the server device and the database. The at least one operation metric is transmitted to the server device for processing, wherein the server device calculates optimal batch size information to reduce the time taken to insert data into the database. Dynamic feedback comprising batch size information is transmitted from the server device to the network switch. The network switch batches the response data according to the dynamic feedback received from the server device.

In some examples, the at least one operation metric is a function of an upper processing time value of the server device for previous batched response date.

In some examples, the response data is initially batched according to an upper processing time taken for the server device to insert a batch of response data into the database.

In some examples, the batch size is capped according to the maximum buffer size of the server device.

In some examples, the server device provides the network switch with dynamic feedback comprising at least one of: an optimal number of response data packets; and an optimal number of rows; for the batched response data.

In some examples, the server device inserts the batched response data into the database in either: a bulk operation; or a multi-row insertion.

In some examples, the server device inserts the batched response data into the database by either a: single call; or multiple call; insertion.

In some examples, the monitoring device records a time taken for each batch of response data to be processed by the server device. The monitoring device may measure the time taken relative to the size of the batched response data (116) provided by the network switch In some examples, the server device: retrieves at least two time samples from the monitoring device; calculates an optimal batch size; and transmits dynamic feedback, comprising the optimal batch size, to the network switch.

In some examples, the network switch is a TCP switch. The network switch may transmit queries and receive responses over at least one persistent TCP connection.

In some examples, the network switch sends a data query to at least one network connected device.

In some examples, the dynamic feedback varies according to at least one of a size and a shape of the response data received from multiple devices.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present disclosure, which is defined in the accompanying claims.

Further examples of the present disclosure are set out in the following numbered clauses:

1. A system (100) comprising:
 a network switch (110) arranged to transmit queries to, and receive response data (106a, 106b, 106c) from, multiple devices (105a, 105b, 105c) on a network;
 a server device (120) arranged to receive batched response data (116) from the network switch (110) and insert it into a database (130);
 the database (130) arranged to store the batched response data (116) from the server device (120); and
 a monitoring device (140) arranged to obtain operation metrics from at least one of the server device (120) and the database (130), and forward the obtained operation metrics to the server device (120), wherein the server device (120) processes the operation metrics obtained by the monitoring device (140) and transmits dynamic feedback (125) comprising batch size information to the network switch (110), and the network switch (110) batches the response data (106a, 106b, 106c) according to the dynamic feedback (125) to reduce the time taken to insert data into the database (130).

2. The system (100) according to clause 1, wherein the monitoring device (140) measures the time taken for each batch of response data (116) to be processed by the server device (120) and inserted into the database (130) relative to the size of the batched response data (116) provided by the network switch (110).

3. The system (100) according to clause 2, wherein the server device (120):
retrieves at least two time samples from the monitoring device (140);
calculates an optimal batch size; and
transmits the optimal batch size information to the network switch (110) as dynamic feedback (125).

4. The system (100) according to any preceding clause, wherein
the network switch (110) is a TCP switch arranged to transmit queries and receive response data (106a, 106b, 106c) over at least one persistent TCP connection.

5. The system (100) according to any preceding clause, wherein
the response data (106a, 106b, 106c) is initially batched according to an upper processing time taken for the server device (120) to insert a batch of response data (116) into the database (130).

6. The system (100) according to any preceding clause, wherein
the batched response data (116) size is capped according to a maximum receive buffer size of the server device (120).

7. The system (100) according to any preceding clause, wherein
the server device (120) transmits dynamic feedback (125) comprising at least one of:
an optimal number of response data packets; and
an optimal number of rows,
for the batched response data (116).

8. The system (100) according to any preceding clause, wherein
the server device (120) inserts the batched response data (116) into the database (130) by either:
a bulk operation; or
a multi-row insertion.

9. The system (100) according to any preceding clause, wherein
the dynamic feedback (125) causes the server device (120) to insert the batched response data (116) into the database (130) by either:
a single call insertion; or
a multiple call insertion.

10. A method (300) of transmitting and storing data over a network, the method comprising:
receiving (301), at a network switch, response data from at least one network connected device;
batching (302), at the network switch, the response data for transmission to a server device; and
inserting (303), by the server device, the batched response data into a database, whereby the method further comprises:
obtaining (304), at a monitoring device, at least one operation metric from at least one of the server device and the database;
transmitting (305) the at least one operation metric to the server device for processing;
calculating (306) optimal batch size information at the server device to reduce the time taken to insert data into the database;
transmitting (307) dynamic feedback comprising batch size information from the server device to the network switch; and
batching (308), at the network switch, the response data according to the dynamic feedback received from the server device.

11. The method according to clause 10, wherein the at least one operation metric is a function of an upper processing time value of the server device for previous batched response data.

12. The method according to any of clauses 10 or 11, wherein
the batch size is capped according to the maximum buffer size of the server device.

13. The method according to any of clauses 10 to 12, wherein
the server device provides the network switch with dynamic feedback comprising at least one of:
an optimal number of response data packets; and
an optimal number of rows.

14. The method according to any of clauses 10 to 13, wherein
the server device inserts the batched response data into the database in either:
bulk; or
multi-row insertion.

15. The method according to any of clauses 10 to 14, wherein
the server device inserts the batched response data packets into the database by either:
single call; or
multiple call insertion.

16. The method according to any of clauses 10 to 15, wherein
the monitoring device records the time taken for each batch of response data to be processed by the server device.

17. The method according to clause 16, comprising:
retrieving, by the server device, at least two time samples from the monitoring device;
calculating an optimal batch size; and
transmitting dynamic feedback comprising the optimal batch size to the network switch.

18. The method according to any of clauses 10 to 17, wherein
the network switch transmits queries and receives responses over persistent TCP connection.

19. The method according to any of clauses 10 to 18, comprising
sending, from a network switch, a data query to at least one network connected device.

20. The method according to any of clauses 10 to 19, wherein the method is iterative and the dynamic feedback varies according to at least one of a size and a shape of the response data (106a, 106b, 106c) received from multiple devices (105a, 105b, 105c).

What is claimed is:

1. A method of uploading data to a database, the method comprising:
   receiving, at a network switch, response data from at least one network connected device;
   batching, at the network switch, the response data for transmission over the network to a server device; and
   subsequently inserting, by the server device, the batched response data into a database, the database arranged to store the batched response data from the server device, the database comprising a database object having multiple fields and records,
   whereby the method further comprises:
      obtaining, at a monitoring device, at least one operation metric from at least one of the server device and the database;
      transmitting the at least one operation metric to the server device for processing;
      calculating optimal batch size information at the server device to reduce the time taken to insert data into the database;
      transmitting dynamic feedback comprising batch size information from the server device to the network switch; and
      batching, at the network switch, the response data according to the dynamic feedback received from the server device.

2. The method according to claim 1, wherein:
   the at least one operation metric is a function of an upper processing time value of the server device for previous batched response data.

3. The method according to claim 1, wherein:
   the batch size is capped according to the maximum buffer size of the server device.

4. The method according to claim 1, wherein:
   the server device provides the network switch with dynamic feedback comprising at least one of:
      an optimal number of response data packets; and
      an optimal number of rows.

5. The method according to claim 1, wherein:
   the server device inserts the batched response data into the database in either:
      bulk; or
      multi-row insertion.

6. The method according to claim 1, wherein:
   the server device inserts the batched response data packets into the database by either:
      single call; or
      multiple call insertion.

7. The method according to claim 1, wherein
   the monitoring device records the time taken for each batch of response data to be processed by the server device.

8. The method according to claim 7, comprising:
   retrieving, by the server device, at least two time samples from the monitoring device;
   calculating an optimal batch size; and
   transmitting dynamic feedback comprising the optimal batch size to the network switch.

9. The method according to claim 1, wherein
   the network switch transmits queries and receives responses over persistent TCP connection.

10. The method according to claim 1, comprising:
    sending, from a network switch, a data query to at least one network connected device.

11. The method according to claim 1, wherein the method is iterative and the dynamic feedback varies according to at least one of a size and a shape of the response data received from multiple devices.

12. A system comprising:
    a network switch arranged to transmit queries to, and receive response data from, multiple devices on a network;
    a database; and
    a server device arranged to receive batched response data from the network switch over the network and subsequently insert it into the database;
    the database arranged to store the batched response data from the server device, the database comprising a database object having multiple fields and records; and
    a monitoring device arranged to obtain operation metrics from at least one of the server device and the database, and forward the obtained operation metrics to the server device,
    wherein the server device processes the operation metrics obtained by the monitoring device and transmits dynamic feedback comprising batch size information to the network switch, and
    the network switch batches the response data according to the dynamic feedback to reduce the time taken to insert data into the database.

13. The system according to claim 12, wherein:
    the monitoring device measures the time taken for each batch of response data to be processed by the server device and inserted into the database relative to the size of the batched response data provided by the network switch.

14. The system according to claim 13, wherein the server device:
    retrieves at least two time samples from the monitoring device;
    calculates an optimal batch size; and
    transmits the optimal batch size information to the network switch as dynamic feedback.

15. The system according to claim 12, wherein:
    the network switch is a TCP switch arranged to transmit queries and receive response data over at least one persistent TCP connection.

16. The system according to claim 12, wherein:
    the response data is initially batched according to an upper processing time taken for the server device to insert a batch of response data into the database.

17. The system according to claim 12, wherein:
    the batched response data size is capped according to a maximum receive buffer size of the server device.

18. The system according to claim 12, wherein:
    the server device transmits dynamic feedback comprising at least one of:
       an optimal number of response data packets; and
       an optimal number of rows,
    for the batched response data.

19. The system according to claim 12, wherein:
    the server device inserts the batched response data into the database by either:
       a bulk operation; or
       a multi-row insertion.

20. The system according to claim 12, wherein:
the dynamic feedback causes the server device to insert the batched response data into the database by either:
a single call insertion; or
a multiple call insertion.

* * * * *